US005084492A

United States Patent [19]

Pinell et al.

[11] Patent Number: 5,084,492

[45] Date of Patent: * Jan. 28, 1992

[54] HIGH SOLIDS CF PRINTING INK

[75] Inventors: William F. Pinell, Lebanon; Michael E. Seitz, Miamisburg; Gary W. Doll, Englewood, all of Ohio

[73] Assignee: Standard Register Company, Dayton, Ohio

[ * ] Notice: The portion of the term of this patent subsequent to Dec. 26, 2006 has been disclaimed.

[21] Appl. No.: 413,995

[22] Filed: Sep. 28, 1989

[51] Int. Cl.[5] ........................ C09D 5/00; C09D 11/00

[52] U.S. Cl. .................................... 523/161; 503/213; 106/20; 106/32; 264/4.7; 428/402.21

[58] Field of Search .................... 428/402.21; 264/4.7; 106/20, 32; 523/161

[56] References Cited

U.S. PATENT DOCUMENTS

| | | | |
|---|---|---|---|
| 3,466,184 | 9/1969 | Bowler . | |
| 3,466,185 | 9/1969 | Taylor . | |
| 3,672,935 | 6/1972 | Miller et al. . | |
| 4,337,968 | 7/1982 | Maierson . | |
| 4,874,832 | 10/1989 | Jabs et al. | 428/402.21 |

*Primary Examiner*—Joseph L. Schofer
*Assistant Examiner*—Peter D. Mulcahy
*Attorney, Agent, or Firm*—Killworth, Gottman, Hagan & Schaeff

[57] ABSTRACT

A high solids content, aqueous, color developer-containing printing inks having as it main ingredients water, a non-volatile diluent and an acidic color developer such as zinc salicylate or a phenolic resin. The high CF printing ink preferably has a 50–70% by weight solids content and may be used as a low-coat-weight CF coating for preparing carbonless copy paper by coating the high solids CF printing ink on a support sheet at a coat weight of less than 3 $gm/m^2$.

9 Claims, No Drawings

HIGH SOLIDS CF PRINTING INK

CROSS REFERENCE TO RELATED APPLICATIONS

Reference is made to copending application Ser. No. 141,632, filed Jan. 7, 1988, entitled "High Solids CB Printing Ink", the disclosure of which is hereby incorporated by reference.

FIELD OF THE INVENTION

The present invention relates to a high solids content, aqueous, color developer-containing (CF) printing ink (CF ink) and to a carbonless copy paper sheet having that ink coated thereon (CF sheet). More particularly, the present invention relates to high solids content, aqueous, CF printing inks which may be press-applied in the production of carbonless copy paper.

BACKGROUND OF THE INVENTION

In the manufacture of pressure-sensitive recording paper, better known as carbonless copy paper, a layer of pressure-rupturable microcapsules containing a solution of colorless dye precursor is normally coated on the back side of the top sheet of paper of a carbonless copy paper set. This coated backside is known as the CB coating. In order to develop an image or copy, the CB coating must be mated with a paper containing a coating of a suitable color developer, also known as dyestuff acceptor, on its front. This coated front color developer coating is called the CF coating. The color developer is a material, usually acidic, capable of forming the color of the dye by reaction with the dye precursor.

Marking of the pressure-sensitive recording papers is effected by rupturing the capsules in the CB coating by means of pressure to cause the dye precursor solution to be exuded onto the front of the mated sheet below it. The colorless or slightly colored dyestuff, or dye precursor, then reacts with the color developer in the areas in which the dye containing microcapsules were ruptured, thereby effecting the colored marking. Such mechanism for the technique of producing pressure-sensitive recording papers is well known.

Among the well known basic, reactive, colorless chromogenic dye precursors used for developing colored marks when applied to a receiving sheet are such color developers are Crystal Violet Lactone (CVL), the p-toluenesulfonate salt of Michler's Hydrol or 4,4'-bis(-diethylamino) benzhydrol, Benzoyl Leuco Methylene Blue (BLMB), Indolyl Red, Malachite Green Lactone, 8'-methoxybenzoindoline spriopyran, Rhodamine Lactone, and mixtures thereof.

Among well known color developers used on CF sheets are activated clays, zinc salicylate, and phenolic-type resins, such as acetylated phenolic resins, salicylic acid modified phenolics and, particularly, novolac type phenolic resins.

Traditionally CF coatings have been applied to a support sheet such as a paper substrate via a coating station on a paper machine or on an off-line coater. This has been true for most of the different types of CF coatings in use today, whether it involves activated clays, zinc salicylate, the phenolic resins or combinations thereof. In each of the above cases, printers must buy and inventory several different basis weights and colors of each: CB, CFB, and CF. This is true for both the sheet-fed printers as well as the continuous (roll) printers. There are also commercially available CF coatings which are dissolved in a suitable solvent or ink system. These can be applied to the substrate on a printing press by a variety of methods among which are flexographic, lithographic or transfer letter press. These CF printing inks partially eliminate the inventory problem by enabling the printer to inventory only CB and uncoated paper of the various colors and weights.

In terms of the CF sheet various CF coatings and formulations have been used and various methods of applying the CF coating or formulation have been tried. According to the prior art such coating was carried out with an aqueous coating composition over the entire surface of the substrate, such as an aqueous slurry of finely ground phenolic resin, as shown in U.S. Pat. No. 3,672,935 and numerous other patents. The process described in these patents has the disadvantage that, following application of the coating composition, the water must be evaporated and this requires considerable energy. Additionally, the need for drying requires the use of a complex and expensive apparatus for an aqueous coating composition.

It is also known that acidic color developer, such as phenolic resin, can be applied to the paper substrate as a solution in a volatile organic solvent which after application evaporates completely leaving a thin film of solid resin on the paper. The latter method is taught in U.S. Pat. Nos. 3,466,184 and 3,466,185. The consistency of these solid solutions and the necessarily volatile solvents used therein give rise to printing problems and cause swelling of rubber plates and rolls. Furthermore they have high energy requirements and potential environmental contamination problems.

In addition to possible problems with volatile organic emmisions, organic solvent-based CF coatings have a tendency to transparentize the substrate. Accordingly, in U.S. Pat. No. 4,337,968, assigned to the same assignee as the present invention, it is suggested that non-volatile organic solvents be used. It is stated in that patent that in combination with the phenolic resin, a fatty alcohol, and an amorphous lipophilic silica, the non-volatile solvent improves the characteristics of the coated film because there will be a residue of solvent in the solidified gel structure of the spongy color developer film thereby produced. This high boiling point solvent, as retained in the deposited film, tends to act as a plasticizer and give flexibility to the deposited film, preventing excess dusting during subsequent printing and handling. Having the solvent in small quantities in the deposited film acts in a way to attract the lipophilic components normally found in conventional CB coated systems. Thus, at the instant of impact, the liquid organophilic nature of the CB dye system is more readily attracted into the slightly wetted highly organophilic surface. While the system of U.S. Pat. No. 4,337,968 is a distinct improvement over other organic solvent-based CF coatings, it may still be more desirable to use an aqueous-based CF coating in order to avoid image decline and spread due to aging if the solids content of the ink is high enough to avoid the problems found with typical aqueous-based CF coatings.

The major problem with aqueous CF printing coatings is the large drying capacity required. Traditional water based CF coatings range 4 to 8 gm/m2 dry and are applied from a 25 to 50% solids coatings. A 4 gm/m2 coating at 50% solids requires the removal of 4 grams of water per square meter. A 6 gm/m2 coating at 25% solids requires the removal of 18 grams of water per square meter, i.e., $$\frac{6 \text{ gm/m2 solids}}{.25 \text{ solids}} - 6 \text{ gm/m2} = 18 \text{ gm/m2 Water}$$

In addition, when this amount water is added to a paper substrate, numerous controls must be added to the coater to prevent sheet distortion, curl or cockle. Special grades of paper are also required to avoid excessive penetration and web breaks on the coater. The result is a coater and accompanying facilities that are very expensive to build and operate. The centralization of production, due to high capitalization costs, also produces cost inefficiencies in the form of high scrap levels and transporation costs. All of these factors add to the cost of the resulting CF sheet.

Accordingly, the need remains for high solids content, aqueous, CF printing inks which contain a color developer and for carbonless copy paper coated with such a high solids CF printing ink.

SUMMARY OF THE INVENTION

That need is met by the present invention which provides a carbonless copy paper CF sheet comprising a support sheet having coated thereon a high solids content, aqueous, color developer-containing printing ink at a dry coat weight of less than 3 gm/m$^2$ and preferably less than 2 gm/m$^2$. At a coat weight of 2 gm/m$^2$ and a solids content of 60% such a coating requires the removal of only about 1.33 gm/m$^2$ water. Compared to the traditional water based CF coatings, i.e. those requiring removal of about 10–18 gm/m$^2$ water, this a considerable improvement.

The high solids content, aqueous, color developer-containing printing ink used to produce the CF sheet (or CF side of a CFB sheet where the CB side has a coating of microcapsules containing an oily solvent and a dye precursor capable of reacting with a color developer in order to form a color) contains three major ingredients, namely: water, non-volatile diluent, and an acidic color developer. The solids (non-water) content of the high solids CF printing ink is approximately 50–70%.

The non-volatile diluent may be a polyhydric alcohol such methyl glucoside, sorbitol, pentaerythritol, glycerol, sucrose, trimethylolethane or trimethylolpropane or may be selected polyols, amides, or ureas such as dimethyl urea and dimethyl hydantoin formaldehyde resins; although, alpha methyl glucoside is preferred because of its relatively high (85.5% at 25° C.) hydroscopicity point. Preferably the non-volatile diluent is present in the high solids CF printing ink at the level of about 15–40% by weight.

The acidic color developer is preferably a zinc salicylate, an acetylated phenolic resin, a salicylic acid modified phenolic resin, a zincated phenolic resin, or a novolac type phenolic resin. Preferred is a zincated novolac phenolic resin. The acidic color developer may be present in the high solids CF printing ink within a range of about 10–60% by weight. The water content is preferably 30–50% by weight.

In addition to the three major ingredients, the high solids CF printing ink of the present invention preferably contains a binder and a filler. The binder may be those commonly used with aqueous systems such as starch, casein, polyvinyl alcohol (PVA) polyvinyl pyrrolidone (PVP) and carboxylated styrene butadiene (SBR) latex and combinations thereof. Preferred are PVA and/or SBR since starch, casein and other commonly used aqueous binders may have only limited wet-state shelf life because of biological attack. The fillers used can be aluminum silicates (clays), calcium carbonates, or other additives such as wax or polyethylene, and various combinations thereof.

Finally the high solids CF printing ink may include various miscellaneous ingredients such as a weak base, dyes, pigments, anti-foaming agents, bacteriocides, etc. The resulting preferred high solids CF printing ink has ingredients in the approximate amount by weight as follows: 30 to 50% water, 15 to 40% non-volatile diluent, 10 to 60% acidic color developer, 0 to 10% binder, 0 to 70% filler, and 0 to 5% miscellaneous ingredients.

In addition to the low coat weight/reduced water removal features already mentioned, the high solids CF printing inks of the present invention have a number of other advantageous features. They can be applied on the printing press just after the lithography thereby minimizing the binder requirements of the high solids CF printing ink. If the printing press construction is such that the CF applicator station can only be positioned ahead of the regular printing station (i.e., flexographic, lithographic or transfer letter press), the high solids CF printing ink can be applied first and overprinted during the same operation. Colors can be imparted to white sheets by incorporating dyes and/or pigments to the CF printing ink. Additionally, since the vehicle system imparts minimal distortion to the substrate, the coating can be applied either as a full coating (100% coverage) or as a small spot.

The small amount of water that is added to the sheet is insufficient to cause the sheet distortions that plague normal aqueous coatings. Only modest efforts are required to dry the CF coating of the present invention to a tack-free condition. A heated roll, air bar, or mini-box dryer is adequate to assist drying. As a result the high solids CF printing ink of the present invention can be run on a simple flexo or offset gravure unit which can fit easily into an existing press line.

Accordingly, it is an object of the present invention to provide a high solids, aqueous, color developer-containing printing ink and a carbonless copy paper sheet coated with such a printing ink. These and other objects, features and attendant advantages of the present invention will become apparent to those skilled in the art from a reading of the following detailed description of the preferred embodiments and the appended claims.

DETAILED DESCRIPTION OF THE PREFERRED EMBODIMENTS

In the preferred embodiment, the high solids CF printing ink of the present invention may be used to prepare CF or CFB carbonless copy paper sheets using simple flexographic or offset gravure techniques. The key to the ability to do so is the use of a non-volatile diluent as a partial substitution for the water vehicle in the aqueous CF printing ink. The properties the non-volatile diluent should possess include:

i) its solubility in water should be 33%.

ii) the viscosity of its aqueous solution should be low, i.e. 50 cps. This effectively restricts the non-volatile diluent to low molecular species.

iii) it should be non-hygroscopic (or only slightly hydroscopic). Otherwise, the non-volatile diluent will show the water loss to such an extent as to cause tacking (incomplete drying).

iv) the dried non-volatile diluent material should be essentially tack free.

v) the vapor pressure of the non-volatile diluent should be less than 0.1 mmHg to avoid environmental restrictions and assure worker safety.

Preferred as the non-volatile diluent is alpha methyl glucoside since it is a solid material that acts as a liquid when incorporated in an aqueous CF printing ink. It has a relatively high (85.5% at 25° C.) hygroscopicity point. As result a support sheet such as a paper substrate coated with it exhibits minimal tendencies toward curl and/or sheet distortion. Other polyhydric alcohols which may be used include sorbitol, pentaerythritol, glycerol, sucrose, trimethylolethane and trimethylolpropane. Other non-volatile diluents can be selected polyols, amides or ureas such as dimethyl urea and dimethyl hydantoin formaldehyde resin.

The acidic color developer may be any type of color developer which is water dispersible and serves as an acidic image former producing a color when in combination with a dye precursor. Preferred are phenolic resins and zinc salicylate.

The preferred phenolic resin for use in the present invention is a phenol formaldehyde novolac resin. Either what is termed normal novolac resins or zinc reacted novolac resins can be used. Resins reacted with other appropriate cations to enhance reactivity may also be used. Examples of zinc reacted novolac resins and other metal cations which can be used to enhance the reactivity of novolac resins are disclosed, for example, in U.S. Pat. No. 3,732,120. Rather than being zinc-related, the novolac resin may be present with a separate zinc salt, as disclosed in U.S. Pat. No. 3,723,156.

Thus, the color-producing functionality of the phenolic resin is greatly improved when it is present either in conjunction with a zinc salt or in a form which is actually reacted with a zinc compound in order to produce a zincated resin. While the term zinc is being used, because this is the preferred cation, other metal cations may also be used, such as cadmium (III), zirconium (II), cobalt (II), strontium (II), aluminum (III), copper (III), and tin (II).

While water, a non-volatile diluent, and an acidic color developer are the major ingredients in the high solids CF printing ink of the present invention, the other ingredients in the preferred embodiments are a binder and a filler. In fact, the filler may account for up to 70% by weight of the high solids CF printing ink of the present invention; although, it should be noted that the filler materials are essentially chemically inert in both the ink and on the carbonless copy paper sheet and their use is, therefore, optional. Fillers are used simply to add bulk to the ink and improve the handability and coatability of the ink. Among the fillers which may be used are the aluminum silicates (clays), the calcium carbonates, and other additives such as wax or polyethylene, and various combinations thereof. Numerous other filler materials may also be used as this is not a critical ingredient.

The use of a binder is somewhat more important, but still optional. Likewise, if a binder is used, the binder choice is also somewhat important. Binders are used to improve the adherence of the printing ink to the support sheet so that the coating on the carbonless copy paper does not easily "dust off". However, excessive amounts of binders have an effect on the image producing ability of the color developer.

Generally, known aqueous binders such as starch, casein, polyvinyl alcohol (PVA) polyvinyl pyrrolidone (PVP) and carboxylated styrene butadiene (SBR) latex and combinations thereof may be used. But, starches, casein and other commonly used aqueous binders have only limited applicability in that they are subject to biological attack and therefore may have a relatively short shelf life. For commercial purposes, generally, a wet state shelf life of at least 6 weeks is desirable. Accordingly, PVA and SBR, which are not subject to biological attack and have long shelf lives, are preferred. Up to 8.5% PVA and up to 6.5% SBR may be present, by weight, in the high solids CF printing ink.

Other miscellaneous ingredients up to 5% may be added. Among those ingredients may be a weak base such as sodium hydroxide, sodium tetraborate (borax), and the like. Likewise, if as mentioned above shelf life is being affected by biological attack, it may be desirable to add a bacteriocide. An antifoaming agent may be added to make the high solids CF printing ink more easily coatable.

In any event the high solids CF printing ink of the present invention may be readily easily applied to a support sheet such as a paper substrate, both bond and groundwood having a weight of from 45 gm/m$^2$ to 120 gm/m$^2$, or a plastic film such polyester film, using conventional, gravure, or flexographic coating equipment. The preferred method for applying the high solids CF printing ink is offset gravure because of the ability to apply a uniform low coat-weight of less than 3 gm/m$^2$.

At low press speeds, the high solids CF printing inks of the present invention air dry at ambient temperatures. At higher press speeds, in excess of 200 feet per minute, infrared heaters, a small auxiliary hot air dryer or heated rolls may be used to dry the coated support sheet. Commercially available units can be added to existing printing presses without major reconstruction of the printing press.

The high solids CF printing ink of the present invention may be used to produce a carbonless copy paper CF sheet having a coating on the entire surface or a spot coating of CF material in any desired pattern. It may be also used to produce a CFB sheet wherein the CF material (overall or discontinuous) is coated on the first side of the support sheet, and a CB material (i.e., a coating containing microcapsules having an oily solvent and a dye precursor therein) is coated on the second side of the support sheet.

The following examples will more clearly define the invention:

EXAMPLE I

High Solids CF Printing Ink

With stirring, the following materials are combined to produce a ready-to-use, shelf storage stable, high solids content, aqueous, color developer—containing printing ink.

| | Run 1 | | Run 2 | |
|---|---|---|---|---|
| | Dry Parts By Weight | Wet Parts By Weight | Dry Parts By Weight | Wet Parts By Weight |
| Water | — | 10.37 | — | 42.46 |

-continued

| | | | | |
|---|---|---|---|---|
| Alcosperse 249[1] | .004 | .01 | .12 | .3 |
| Hydrosperse 90[2] | 1.68 | 1.68 | 48.4 | 48.4 |
| Ammonium Hydroxide | — | 2.3 | — | 1.2 |
| Vinol 205[3] | 1.0 | 5.0 | .58 | 2.9 |
| Tamol 850[4] | 0.115 | .38 | .89 | 3.0 |
| HRJ 4002[5] | 57.30 | 104.2 | 19.35 | 35.2 |
| Michem 32535[6] | 1.5 | 4.3 | 1.0 | 2.86 |
| Sta Meg 104[7] | 38.4 | 38.4 | 29 | 29.0 |
| Dow 620[8] | — | — | .66 | 1.32 |
| Dow Antifoam B[9] | .003 | .03 | .003 | .03 |
| | 100.0 | 166.67 | 100.0 | 166.67 |
| Total % Solids | | 60% | | 60% |
| Total Active Phenolic | | 52.1% | | 17.6% |
| #2 LVT Viscosity @ 60 RPM's | | | | 400 cps |

[1]An ammonium polyacrylate dispersent from Alco Chemical Co., Chattanooga, Tenn.
[2]A clay filler from Huber Clay, Macon, Ga.
[3]A polyvinol alcohol binder from Air Products, Covert City, Ky.
[4]A dispersing agent from Rohm and Haas, Philadelphia, PA.
[5]A zincated novolac phenolic resin color developer available from Schenectady Chemical, Inc.
[6]A polyethylene filler from Michelman Inc., Cincinnati, Ohio.
[7]An alpha methyl glucoside non-volatile diluent available from Horizon Chemcial Co.
[8]A SBR binder available from Dow Chemical Co.
[9]An antifoaming agent available from Dow Chemical Co.

EXAMPLE 2

Carbonless Copy Paper Sheet

An offset gravure press was loaded with the inks of Example 1 and adjusted to apply 2 gm/m$^2$ of the ink to a paper support sheet (12 lbs weight 17×22 ream). The press was run at 600 feet per minute. Heated rolls with surface temperature 105° C. were used to help evaporate the water.

The result was a carbonless copy paper sheet having a CF coating thereon. Adhesion of the CF coating to the paper was good. The coating essentially remains on the surface of the paper and does not unduly diffuse within the fibers, thus, leaving the reactive color developer of the coating on the surface of the paper and yet highly adhesively bonded thereto.

A commercial CB sheet, having a coating of CVL dye precurser in microcapsules thereon, when mated with the sensitized record sheet of this example, gave dark blue marks on the sensitized record sheet at points corresponding to positions marked on the upper surface of the CB sheet.

It will be obvious to those skilled in the art that various changes may be made without departing from the scope of the invention which is not to be considered limited to what is described in the specification.

What is claimed is:

1. A high solids content, aqueous, color developer-containing printing ink for use as a coated front color development coating on a carbonless paper sheet, comprising by weight about:

30 to 50% water,

15–40% non-volatile diluent, and

10–60% acidic color developer capable of forming a dye color by reaction with a dye precursor.

2. The printing ink of claim 1 wherein said non-volatile diluent is selected from the group consisting of polyhydric alcohols, polyols, amides and ureas.

3. The printing ink of claim 2 wherein said acidic color developer is selected from the group consisting of zinc salicylate, acetylated phenolic resins, salicylic acid modified phenolic resins, zincated phenolic resins, and novolac type phenolic resins.

4. The printing ink of claim 3 wherein said non-volatile diluent is alpha methyl glucoside and said acidic color developer is a zincated novolac phenolic resin.

5. The printing ink of claim 3 further including a binder selected from the group consisting of starch, casein, polyvinyl alcohol, polyvinyl pyrrolidone and carboxylated styrene butadiene latex, and combinations thereof.

6. The printing ink of claim 5 further including a filler selected from the group consisting of aluminum silicates, calcium carbonates, wax, polyethylene, and combinations thereof.

7. The printing ink of claim 6 wherein said filler is a combination of aluminium silicate, calcium carbonate and polyethylene.

8. The printing ink of claim 6 wherein the ingredients are present in the approximate amount by weight of 30 to 50% water 15 to 40% non-volatile diluent 10 to 60% acidic color developer 0 to 10% binder 0 to 70% filler 0 to 5% miscellaneous ingredients.

9. The printing ink of claim 8 wherein said non-volatile diluent is alpha methyl glucoside, said acidic color developer is a zincated novolac phenolic resin, said binder is selected from the group consisting of polyvinyl alcohol and carboxylated styrene butadiene later and combinations thereof, and said filler is selected from the group consisting of aluminium silicate, calcium carbonate, polyethlene and combinations thereof.

* * * * *